US009060329B2

(12) United States Patent
Montemurro

(10) Patent No.: US 9,060,329 B2
(45) Date of Patent: Jun. 16, 2015

(54) METHODS AND APPARATUS FOR USE IN FACILITATING COMMUNICATION FOR DIFFERENT TYPES OF WIRELESS NETWORKS

(75) Inventor: Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 270 days.

(21) Appl. No.: 13/490,068

(22) Filed: Jun. 6, 2012

(65) Prior Publication Data

US 2013/0331141 A1 Dec. 12, 2013

(51) Int. Cl.
*H04W 68/00* (2009.01)
*H04W 48/18* (2009.01)
*H04W 4/06* (2009.01)
*H04W 48/10* (2009.01)
*H04W 8/18* (2009.01)

(52) U.S. Cl.
CPC .............. *H04W 48/18* (2013.01); *H04W 4/06* (2013.01); *H04W 48/10* (2013.01); *H04W 8/18* (2013.01)

(58) Field of Classification Search
USPC ............. 455/41.1, 422.1, 410, 574, 515, 524, 455/414.1, 406, 433, 435.1; 370/328–339, 370/310, 433, 252, 310.2
See application file for complete search history.

(56) References Cited

U.S. PATENT DOCUMENTS

| | | | |
|---|---|---|---|
| 7,190,981 B2 * | 3/2007 | Cherian ........................ | 455/574 |
| 7,701,958 B2 * | 4/2010 | Abrol et al. ................... | 370/433 |
| 7,924,785 B2 | 4/2011 | Shaheen et al. | |
| 7,957,357 B2 | 6/2011 | Tysowski et al. | |
| 8,210,433 B2 * | 7/2012 | Jalkanen et al. .............. | 235/451 |
| 2005/0148299 A1 | 7/2005 | Buckley | |
| 2005/0232209 A1 * | 10/2005 | Buckley et al. ............... | 370/338 |
| 2006/0183477 A1 | 8/2006 | Bocking et al. | |
| 2006/0217147 A1 | 9/2006 | Olvera-Hernandez et al. | |
| 2007/0064650 A1 | 3/2007 | Lohtia et al. | |
| 2008/0108437 A1 * | 5/2008 | Kaarela et al. ................. | 463/42 |
| 2009/0011773 A1 | 1/2009 | Balachandran et al. | |

(Continued)

FOREIGN PATENT DOCUMENTS

| EP | 1326378 A2 | 9/2003 |
|---|---|---|
| EP | 1326378 | 7/2006 |

(Continued)

OTHER PUBLICATIONS

Bluetooth SIG Imaging Working Group:, "Basic Imaging Profile. Interoperability Specification", Bluetooth Documentation, Jul. 25, 2003, XP007900617, pp. 1-100, http://www.bluetooth.com/NR/rdonlyres/182ccd92-3481-44F0-B901-9181BE573AFA/924/BIP_SPEC_V10.pdf.

(Continued)

*Primary Examiner* — Ganiyu A Hanidu
(74) *Attorney, Agent, or Firm* — Ridout & Maybee LLP

(57) ABSTRACT

Techniques in a wireless device for facilitating communication for different types of wireless networks are described. The device displays a list of identifiers of wireless networks, and receives an input request for selecting one of the wireless networks for communication. When the selected wireless network is of a first type, the device attempts to establish a connection with the selected wireless network. When the selected wireless network is of a second type, the device launches or displays an input prompt to launch an application having a stored association with a device type of the selected wireless network.

22 Claims, 9 Drawing Sheets

(56) References Cited

U.S. PATENT DOCUMENTS

| | | | |
|---|---|---|---|
| 2009/0175207 A1 | 7/2009 | Stephenson et al. | |
| 2011/0086613 A1* | 4/2011 | Doudkine et al. | 455/410 |
| 2011/0149789 A1 | 6/2011 | Edge | |
| 2011/0149806 A1 | 6/2011 | Verma et al. | |
| 2011/0310875 A1 | 12/2011 | Tysowski et al. | |
| 2011/0319056 A1* | 12/2011 | Toy et al. | 455/412.2 |
| 2012/0044536 A1* | 2/2012 | Hall et al. | 358/1.15 |
| 2012/0076118 A1 | 3/2012 | Montemurro et al. | |
| 2012/0084364 A1 | 4/2012 | Sivavakeesar | |
| 2012/0106475 A1* | 5/2012 | Jung | 370/329 |
| 2013/0219211 A1* | 8/2013 | Gopinath et al. | 714/3 |

FOREIGN PATENT DOCUMENTS

| | | |
|---|---|---|
| EP | 2432277 A1 | 3/2012 |
| EP | 2458898 A2 | 5/2012 |
| WO | 2007073584 A1 | 7/2007 |
| WO | 2012006446 A1 | 1/2012 |

OTHER PUBLICATIONS

European Search Report & Written Opinion for EP 12171063.6, Nov. 23, 2012.

Canadian Intellectual Property Office, "A Requisition by the Examiner in accordance with Subsection 30(2) of the Patent Rules" in respect of Application No. 2,816,743, Dec. 3, 2014.

* cited by examiner

METHODS AND APPARATUS FOR USE IN FACILITATING COMMUNICATION FOR DIFFERENT TYPES OF WIRELESS NETWORKS

BACKGROUND

1. Field of the Technology

The present disclosure relates generally to techniques in electronic devices which are configured for wireless communications, such as Wi-Fi peer-to-peer (P2P) wireless communications.

2. Description of the Related Art

A wireless communication device, such as a portable battery-powered wireless telephony device, may be configured to communicate in wireless communication networks. For example, such a device may communicate via access points (APs) of wireless local area networks (WLANs) in accordance with IEEE 802.11 standards or the like. Such a device may additionally communicate using peer-to-peer communication techniques, for example, in accordance with the Wi-Fi Peer-To-Peer (P2P) Technical specification, and/or be certified as a "Wi-Fi Direct" device.

There is a need for efficiently facilitating communication in these and similar environments.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Techniques in a wireless device for facilitating communication for different types of wireless networks are described herein. In one illustrative example, the device displays a list of identifiers of wireless networks, and receives an input request for selecting one of the wireless networks for communication. When the selected wireless network is of a first type, the device attempts to establish a connection with the selected wireless network. When the selected wireless network is of a second type, the device launches or displays an input prompt to launch an application having a stored association with a device type received from the selected wireless network.

Example Environment.

Figure 1:
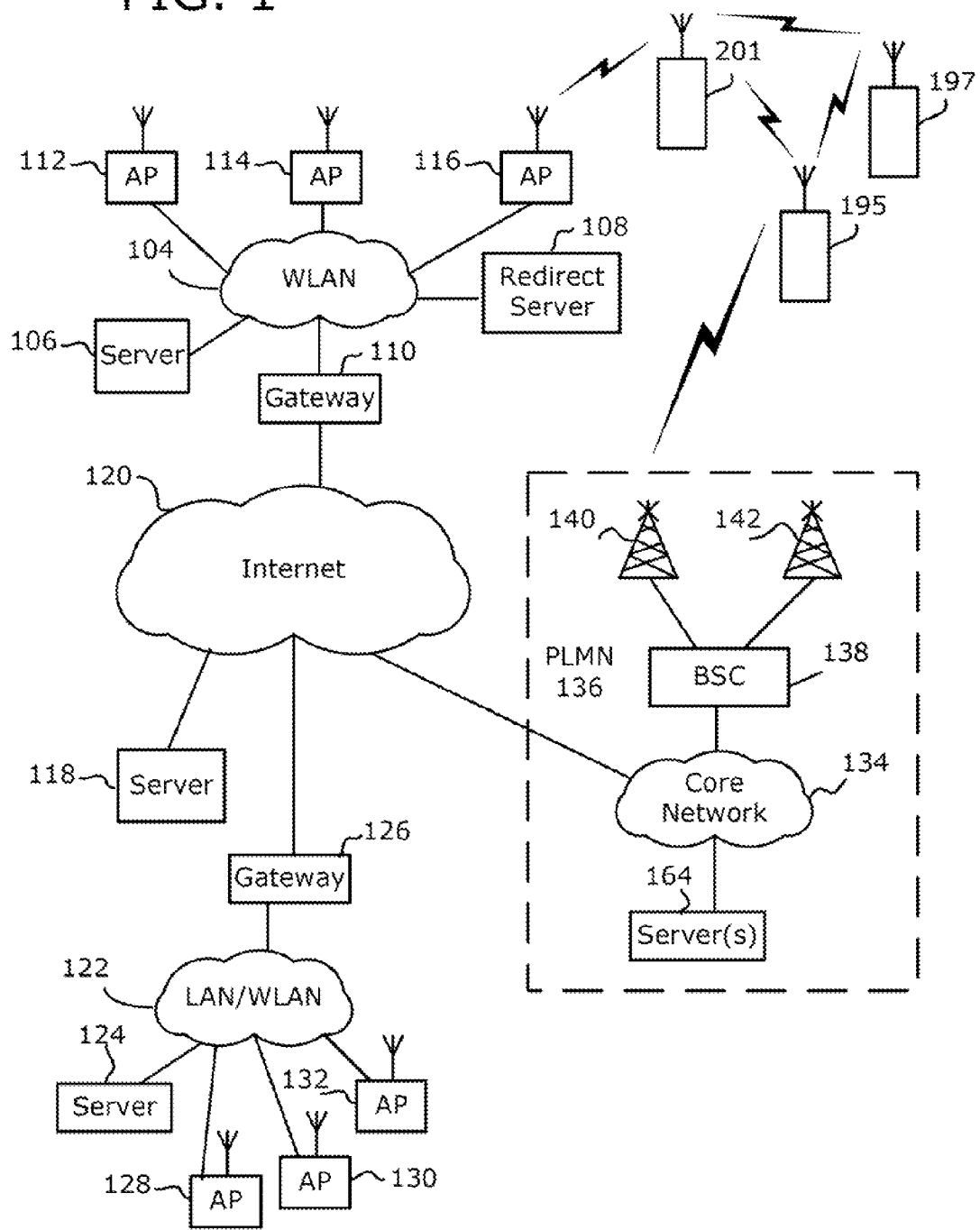
FIG. 1 is an illustrative representation of a communication system which includes wireless communication networks (e.g. WLANs) through which a wireless communication device may communicate.

To illustrate one environment within which the techniques of the present disclosure may be practiced, FIG. 1 illustrates a wireless communication device 201 which may communicate in a communication system 100. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g. Web page information) which is rendered in a visual display of wireless device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g. an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g. server 106) for user data of an application associated with a user account. The application of wireless device 201 and the server may be or include, for example, an electronic mail (e-mail) application program for the communication of e-mail messages.

Wireless device 201 may be additionally configured to access communication services via a Public Land Wireless Network (PLMN) 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), wireless device 201 additionally or alternatively communicates using peer-to-peer communication techniques, for example, in accordance with the Wi-Fi Peer-To-Peer (P2P) Technical specification, and/or be certified as a "Wi-Fi Direct" device.

Accordingly, illustrating further in FIG. 1, wireless device 201 and one or more other wireless devices 195 and 197 in FIG. 1 may be operative to establish Wi-Fi P2P wireless network connections with each other in a Wi-Fi P2P wireless network. Here, one of the communicate devices may be configured to enter into an AP mode of operation, so that other communication devices may associate with them for direct RF communications therebetween. An AP mode of operation, which may be referred to as a "wireless AP mode" or the like, provides a benefit due to the high data rates available over WLAN links. Here, again, data may be communicated directly between the wireless devices without the data traversing any wireless network infrastructure, where one of the devices is set to operate or serve as an AP (switching operation from as an end terminal) and the other device operates as an end terminal to associate and connect with the AP (i.e. wireless device 201 operating as an AP) for communications. Wireless device 201 may operate such that, when in the AP mode of operation with other communication devices 195 and 197, it also operates as a client with another AP.

Figure 2:
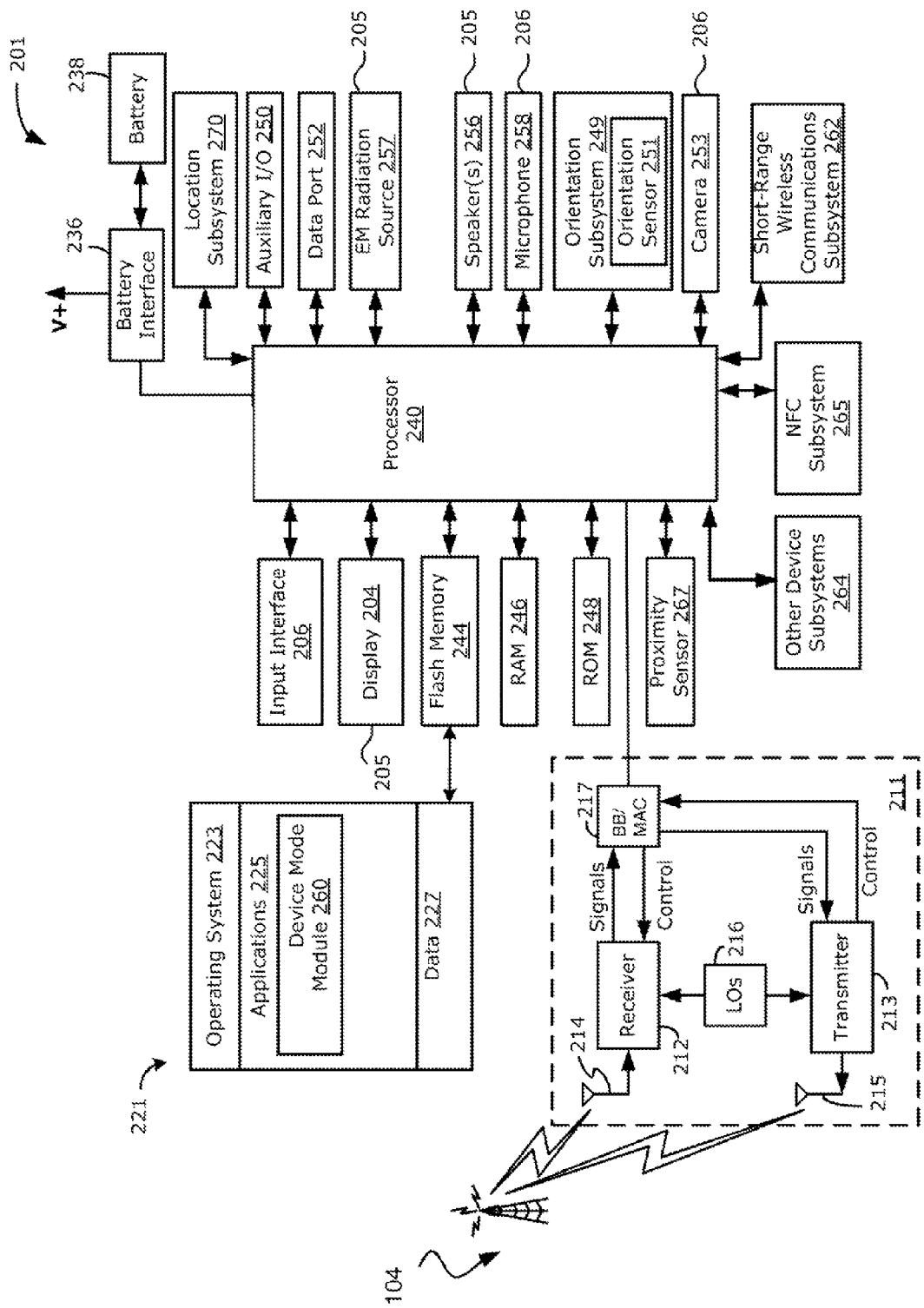
FIG. 2 is an example of a schematic block diagram of a wireless communication device.

Reference will now be made to FIG. 2 which illustrates one example of a schematic block diagram of wireless device 201. In the illustrated example, wireless device 201 is a communication device and, more particularly, is a mobile communication device having data and voice communication capabilities, and configured to communicate with other computer systems (e.g., via the Internet). It will, however, be appreciated that wireless device 201 may take other forms.

Depending on the functionality provided by wireless device 201, in various examples, wireless device 201 may be a multiple-mode communication device configured for both data and voice communication, a mobile telephone, such as a smartphone, a wearable computers such as a watch, a tablet computer such as a slate computer, a personal digital assistant (PDA), or a computer system. Wireless device 201 may take other forms apart from those specifically listed above. The electronic device may also be referred to as a mobile communications device, a communication device, a mobile device and, in some cases, as a device.

Wireless device 201 includes a controller including one or more processors 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range wireless communication subsystem 262 and other device subsystems generally designated as 264. Some of the subsystems shown in FIG. 2 perform communication-related functions, whereas other subsystems may provide "resident" or on-device functions.

In at least some examples, wireless device 201 may include a touchscreen display which acts as both an input interface 206 (i.e., touch-sensitive overlay) and an output interface 205 (i.e., display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some examples, the touch-sensitive overlay may have a touch-sensitive input surface which is larger than the display 204. For example, in at least some examples, the touch-sensitive overlay may extend overtop of a frame 312 (of FIG. 3) which surrounds the display 204. In such example, the frame 312 (of FIG. 3) may be referred to as an active frame since it is capable of acting as an input interface 206. In at least some examples, the touch-sensitive overlay may extend to the sides of wireless device 201.

As noted above, in some examples, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some examples, wireless device 201 may communicate with any one of a plurality of stations or access points (APs) of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some examples, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some examples, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some examples, the orientation sensor 251 is an accelerometer, such as a three-axis accelerometer. An accelerometer is a sensor which converts acceleration from motion (e.g., movement of the device 201 or a portion thereof due to the strike force) and gravity which are detected by a sensing element and converted into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some examples, specifies the orientation of the device 201 relative to the gravitational field of the earth.

In some examples, the orientation subsystem 249 may include other orientation sensors 251, instead of or in addition to accelerometers. For example, in various examples, the orientation subsystem 249 may include a gravity sensor, a gyroscope, a tilt sensor, an electronic compass or other suitable sensor, or combinations thereof. In some examples, the device orientation subsystem 249 may include two or more orientation sensors 251 such as an accelerometer and an electronic compass.

Wireless device 201 may, in at least some examples, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some examples, wireless device 201 may include a plurality of speakers 256. For example, in some examples, wireless device 201 may include two or more speakers 265. The two or more speakers 256 may, for example, be disposed in spaced relation to one another. That is, in at least some examples, wireless device 201 may include a first speaker and a second speaker and the first speaker and the second speaker may be spatially separated from one another within wireless device 201. In at least some examples, the display 204 may be disposed between the first speaker and the second speaker of the electronic device. In such example, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some examples, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some examples, wireless device 201 includes a front facing camera 253. A front facing camera 253 is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. Alternatively, or additionally, camera 253 may be located on a rear face of wireless device 201. The camera 253 may be a fixed position camera which is not movable relative to the display 204 of wireless device 201 and/or the housing of wireless device 201. In such examples, the direction of capture of the camera is always predictable relative to the display 204 and/or the housing. In at least some examples, the camera may be provided in a central location relative to the display 204 to facilitate image acquisition of a face.

In at least some examples, wireless device 201 includes an electromagnetic (EM) radiation source 257. In at least some examples, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some examples, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some examples, the electromagnetic radiation source 257 may be an infrared (IR) radiation source which is configured to emit infrared radiation. In at least some examples, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some examples, the camera 253 is configured to capture at least some electromagnetic radiation which is not in the visible spectrum.

In some examples, wireless device 201 is provided with a service routing application programming interface (API) which provides an application with the ability to route traffic through a serial data (i.e., USB) or BLUETOOTH® (BLUETOOTH® is a registered trademark of Bluetooth SIG, Inc.) connection to a host computer system using standard connectivity protocols. When a user connects their wireless device 201 to the host computer system via a USB cable or BLUETOOTH® connection, traffic that was destined for wireless network 104 is automatically routed to wireless device 201 using the USB cable or BLUETOOTH® connection. Similarly, any traffic destined for wireless network 104 is automatically sent over the USB cable BLUETOOTH® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some examples, be a wireless device which is the same or similar to wireless device 201 discussed with reference to FIG. 1. In at least some examples, the short-range communication subsystem 262 is a wireless bus protocol compliant communication mechanism such as a BLUETOOTH® communication module to provide for communication with similarly-enabled systems and devices.

Wireless device 201 stores data 227 in an erasable persistent memory, which in one example is the flash memory 244. In various examples, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g., flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some examples, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 2, the software modules 221 include operating system software 223 and other software applications 225 such as device mode module 260. In the example of FIG. 2, the device mode module 260 is implemented as a stand-alone application 225. However, in other examples, the device mode module 260 could be implemented as part of the operating system 223 or another application 225.

The software applications 225 on wireless device 201 may also include a range of additional applications, including for example, a notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (e.g., the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e., the flash memory 244), or written into and executed from the RAM 246 for execution by the processor 240 at runtime.

Example Smartphone Electronic Device.

Figures 3, 4:
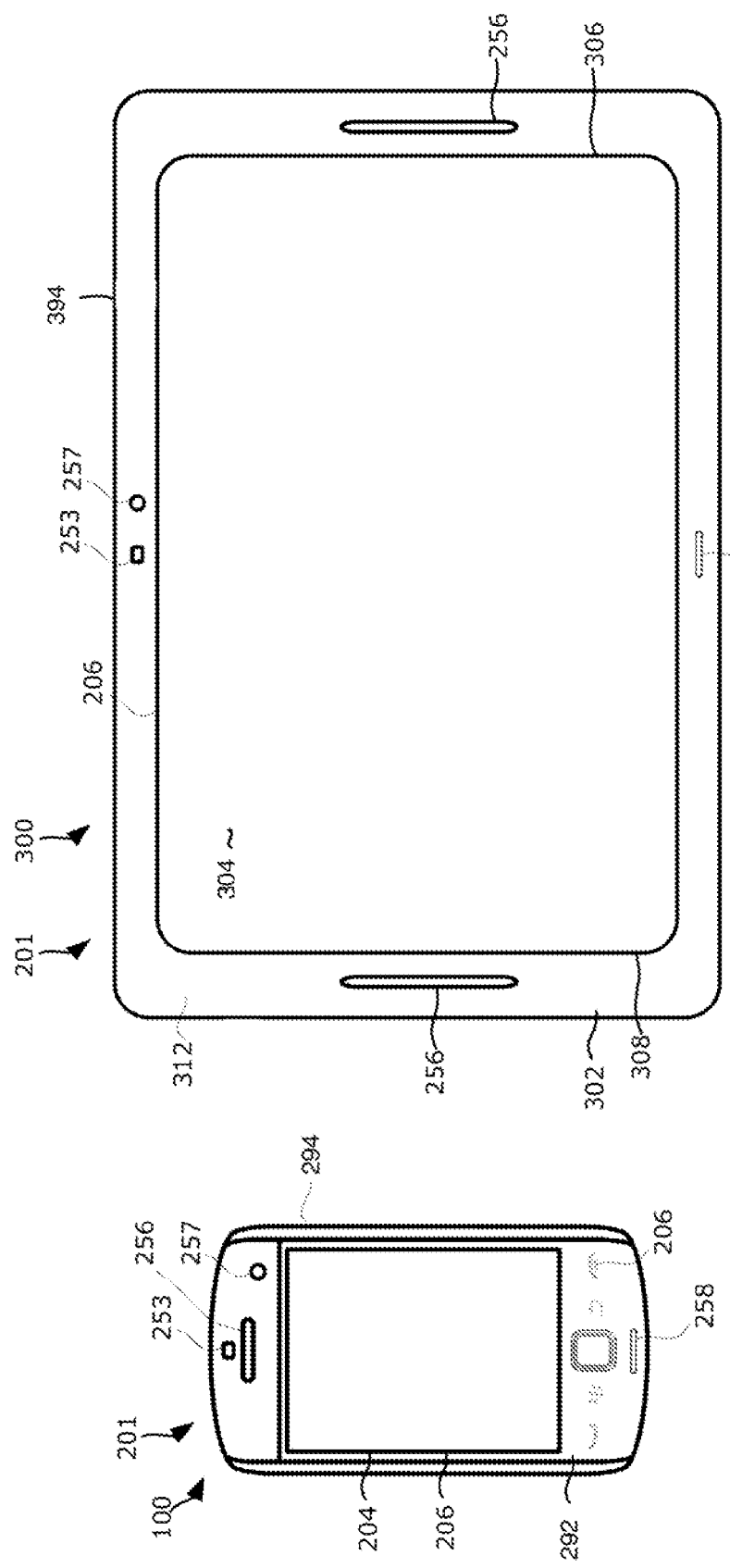
FIGS. 3 and 4 are some examples of different types of wireless devices of the present disclosure, which include a smartphone (FIG. 3) and a tablet computer (FIG. 4)

Referring now to FIG. 3, a front view of an example wireless device 201 which is a smartphone 300 is illustrated. The smartphone 300 is a mobile phone which offers more advanced computing capability than a basic non-smartphone cellular phone. For example, the smartphone 300 may have the ability to execute third party applications which are stored on the smartphone.

The smartphone 300 may include the components discussed above with reference to FIG. 2 or a subset of those components. The smartphone 300 includes a housing 294 which houses at least some of the components discussed above with reference to FIG. 2.

In the example illustrated, the smartphone includes a display 204, which may be a touchscreen display which acts as an input interface 206. The display 204 is disposed within the smartphone 300 so that it is viewable at a front side 292 of the smartphone 300. That is, a viewable side of the display 204 is disposed on the front side 292 of the smartphone. In the example illustrated, the display 204 is framed by the housing 294.

The example smartphone 300 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example illustrated, the smartphone includes a single speaker 256 which is disposed vertically above the display 204 when the smartphone 300 is held in a portrait orientation where its height is longer than its width. The speaker 256 may be disposed on the front face of the smartphone 300.

While the example smartphone 300 of FIG. 3 includes a single speaker 256, in other examples, the smartphone 300 may include a greater number of speakers 256. For example, in at least some examples, the smartphone 300 may include a second speaker 256 which is disposed vertically below the display 204 when the smartphone is held in a portrait orientation where its height is longer than its width (i.e., the orientation illustrated in FIG. 3).

The example smartphone 300 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 300 also includes a front facing camera 253 which may be located vertically above the display 204 when the smartphone 300 is held in a portrait orientation where its height is longer than its width. The front facing camera 253 is located so that it may capture images of objects which are located in front of and/or surrounding the front side of the smartphone 300.

The example smartphone 300 also includes an electromagnetic radiation source 257. The electromagnetic radiation source 257 is disposed on the front side 292 of the smartphone 300. In this orientation, electromagnetic radiation which is produced by the electromagnetic radiation source 257 may be projected onto objects which are located in front of and/or surrounding the front side of the smartphone 300. Such electromagnetic radiation (or the projection of electromagnetic radiation onto objects) may be captured on images obtained by the camera 253.

Example Tablet Electronic Device.

The wireless device may be a tablet computer 400 ("tablet"), one of which is illustrated in FIG. 4. Tablet computer 400 of FIG. 4 may include many of the same features and components of the smartphone 300 of FIG. 3. However, tablet computer 400 of FIG. 4 is generally larger than the smartphone 300 of FIG. 3. Tablet computer 400 may include the components discussed above with reference to FIG. 2 or a subset of those components. Tablet computer 400 includes a housing 394 which houses at least some of the components discussed above with reference to FIG. 2.

Tablet computer 400 includes a display 304, which may be a touchscreen display which acts as an input interface 206. The display 304 is disposed within tablet computer 400 so that it is viewable at a front side 302 of tablet computer 400. That is, a viewable side of the display 304 is disposed on the front side 302 of tablet computer 400. In the example illustrated, the display 304 is framed by the housing 394, with use of a frame 312 which surrounds the display 304. The frame 312 is portion of the housing 394 which provides a border around the display 304. In at least some examples, the frame 312 is an active frame 312. That is, the frame has a touch sensitive overlay which allows wireless device 201 to detect a touch applied to the frame, thereby allowing the frame 312 to act as an input interface 206 (of FIG. 2).

The example tablet computer 400 includes a plurality of speakers 256. In the example illustrated, the tablet includes two speakers 256. The two speakers 256 are disposed on opposing sides of the display 304. More particularly, when tablet computer 400 is held in a landscape orientation (such as the orientation illustrated in FIG. 4) where its width is longer than its height, one of the two speakers is disposed on a right side 306 of the display 304 and one of the speakers is disposed on the left side 308 of the display 304. Both speakers 256 are disposed on the front side 302 of tablet computer 400.

The example tablet computer 400 also includes a microphone 258. In the example illustrated, the microphone 258 is vertically disposed below the display 304 when the tablet computer is held in the landscape orientation illustrated in FIG. 4. The microphone 258 may be located in other locations in other examples.

The example tablet computer 400 also includes a front facing camera 253 which may be located vertically above the display 304 when tablet computer 400 is held in a landscape orientation (i.e., the orientation of FIG. 3). The front facing camera 253 is located so that it may capture images of objects which are located in front of and/or surrounding the front side of tablet computer 400.

The example tablet computer 400 also includes an electromagnetic radiation source 257. The electromagnetic radiation source 257 is disposed on the front side 304 of tablet computer 400. In this orientation, electromagnetic radiation which is produced by the electromagnetic radiation source 257 may be projected onto objects which are located in front of and/or surrounding the front side 302 of tablet computer 400. Such electromagnetic radiation (or the projection of electromagnetic radiation onto objects) may be captured on images obtained by the camera 253.

Although a specific wireless device has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i:e. IEEE 802.16), or an Ultra-WideBand (UWB)-based network (i.e. IEEE 802.15), as a few examples.

Example Wireless Network Configurations/Connections.

Figure 5:
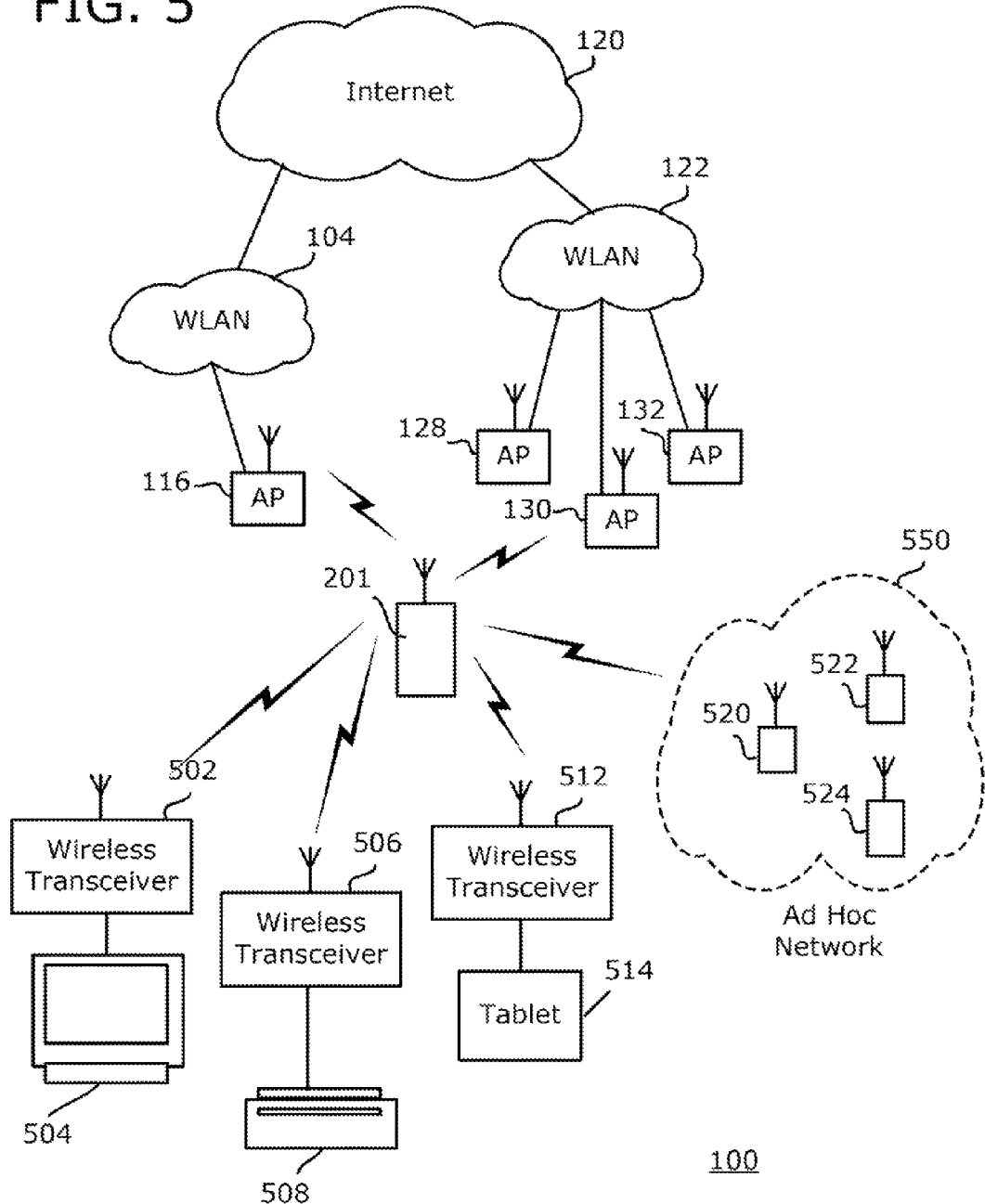
FIG. 5 is an illustration representation of a part of the communication system of FIG. 1 with different types of wireless networks, including different types of Wi-Fi peer-to-peer (P2P) wireless networks associated with different applications.

FIG. 5 is an illustrative representation of a part of the communication system 100 of FIG. 1, which illustrates different types of wireless network configurations which may involve wireless device 201. Wireless networks 104 and 122 are WLANs of the traditional "WLAN infrastructure" type, which typically provide for external network connectivity, as described earlier in relation to FIG. 1. For example, wireless networks 104 and 122 are configured to provide or facilitate access to the Internet 120 (or other communication network, such as a public communication network) for wireless device 201 when connected therewith. In this case, wireless device 201 may make use of its WLAN profiles for connecting with such WLANs.

Other wireless networking configurations include Wi-Fi peer-to-peer (P2P) wireless networking configurations. For example, in FIG. 5 it is shown that wireless device 201 may establish a Wi-Fi P2P wireless connection with a display device 504 (or monitor) which includes a wireless transceiver 502. Such Wi-Fi P2P wireless network connection may be suitable for applications such as, for example, a streaming media application, or a display or presentation application.

It is also shown that wireless device 201 may establish a Wi-Fi P2P wireless network connection with a printer device 508 which includes a wireless transceiver 506. Such Wi-Fi P2P wireless network connection may be suitable for applications such as, for example, a print application or a facsimile application.

Even further, it is shown that wireless device 201 may establish a Wi-Fi P2P wireless network connection with a tablet 514 which includes a wireless transceiver 512. An example tablet was previously shown and described in relation to FIG. 4. Such Wi-Fi P2P wireless network connection may be suitable for an applications such as, for example, a "bridge" or "bridging" application, where wireless device 201 is further configured for cellular telecommunications (e.g. equipped with a cellular transceiver) but tablet 514 is not. In such application, tablet 514 is able to achieve external network (e.g. Internet) connectivity, being connected to wireless device 201 for communications via the cellular telecommunication network.

It is further shown in FIG. 5 that wireless device 201 may establish a Wi-Fi P2P wireless network connection in an ad hoc wireless network 550 which includes one or more other wireless devices 520, 522, and 524. Such Wi-Fi P2P wireless network connection may be suitable for applications such as, for example, a file sharing application, a conference meeting application, a remote control application, or a game or gaming application. In many instances, such ad hoc wireless networks provide no external network connectivity.

When wireless device 201 is connected as such, using one or more Wi-Fi P2P wireless network connections, data may be communicated "directly" between wireless device 201 and the other devices (i.e. without the data traversing any fixed wireless network infrastructure).

Profiles for Applications which Make Use of Wi-Fi P2P Wireless Connections.

As described earlier, wireless device 201 has different types of applications stored therein. These applications may include, as examples, a messaging application, a voice telephony application, a Web browsing application, a streaming media application, a file sharing application, a game application, a printer application, a facsimile application, a display or presentation application, a military application, as examples. Wireless device 201 is optimized to establish the appropriate wireless networks based on which type of application is invoked.

Figure 6:
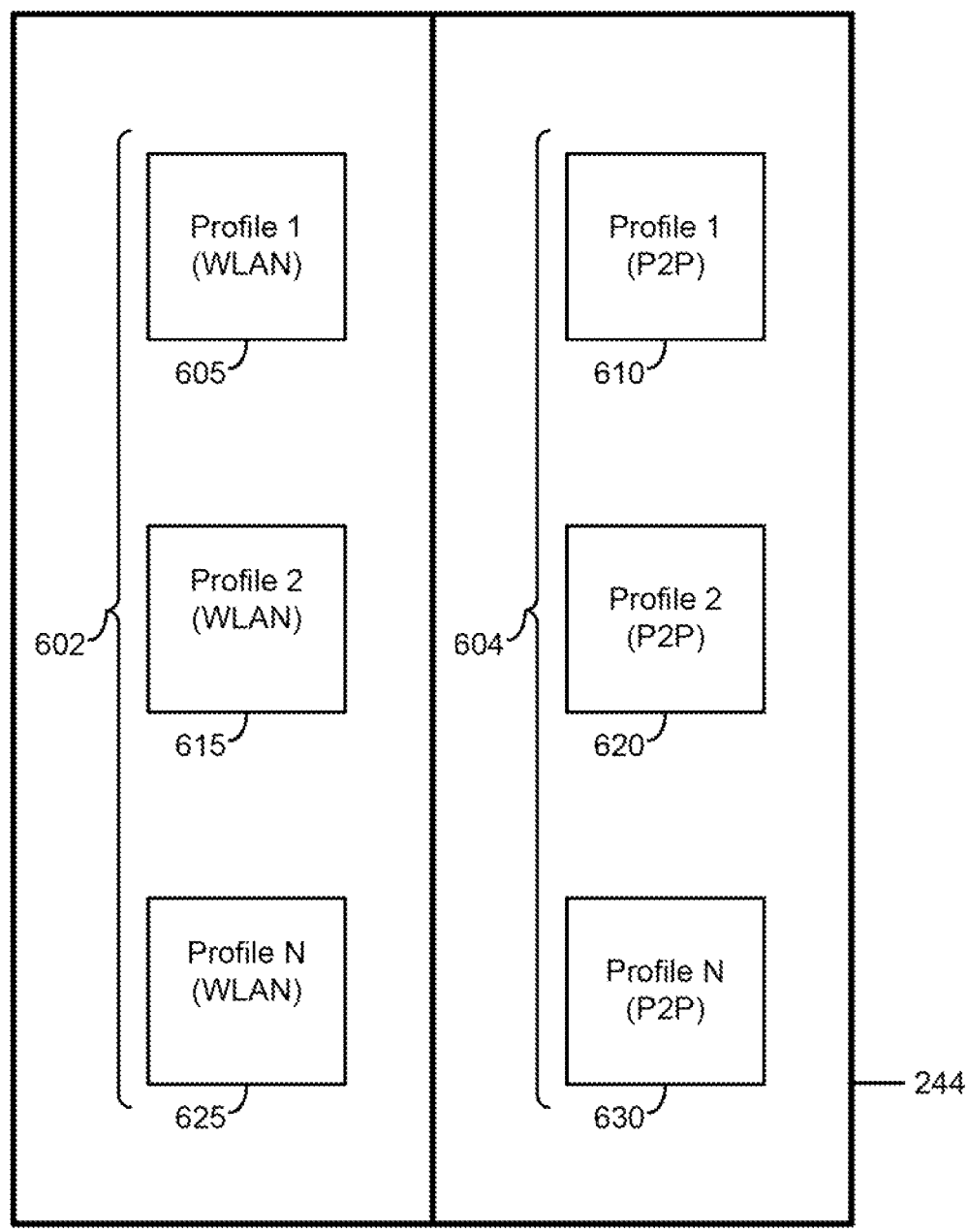
FIG. 6 is an illustrative representation of a portion of memory which includes a plurality of profiles, including profiles associated with applications and/or services which may make use of Wi-Fi P2P wireless networks.

Referring ahead to FIG. 6, an illustrative representation of another portion of memory 224 of wireless device 201 is shown. Memory 224 is shown to store a plurality of profiles for wireless networking. The profiles include one or more profiles 602 associated with WLAN infrastructure networks, and/or one or more profiles 604 associated with applications and/or services which utilize Wi-Fi P2P wireless network connections. In FIG. 6, profiles 602 are shown to include profiles 605, 615, and 625, whereas profiles 604 are shown to include profiles 610, 620, and 630. Profiles 602 may be or be referred to as WLAN profiles, whereas profiles 604 may be or be referred to as Wi-Fi P2P wireless networking profiles or Wi-Fi Direct profiles.

Each one of profiles 602 is associated with a particular WLAN infrastructure network, and includes a plurality of parameters and/or properties for accessing the particular WLAN. The WLAN information may include an identification which identifies the WLAN to access (e.g. a SSID or ESSID). The WLAN information may also include authentication and/or security information for obtaining access to the WLAN (e.g. a network key, passkey, security key, etc.). One of the WLANs appropriate WLAN from profiles 602 will be selected for communication when available, as prioritized in a prioritized list of the profiles 602. When not connected in a WLAN, the wireless device normally operates to search for WLANs identified in its stored profiles 602. Conversely, the wireless device normally refrains from searching for and communicating in WLANs other than those WLANs identified in stored profiles 602.

On the other hand, each one of profiles 604 is associated with one of the applications and/or services which utilizes a particular type and/or configuration of Wi-Fi P2P wireless network (or Wi-Fi Direct network). Each one of profiles 604 includes parameters and/or properties associated with establishing the particular type and/or configuration of Wi-Fi P2P wireless network for the application and/or service. Profiles 604 may be created, viewed, updated, enabled, and disabled, as described in the present disclosure (see e.g. discussion in relation to FIG. 10).

Properties in profiles 604 may include the following. Properties may include a device type property which indicates a device type of the device for the Wi-Fi P2P wireless network connection to be established. The device type may be the device type that is being searched for in the discovery. Note that there may be two device types specified in the profile: a primary device type and a secondary device type. The device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The device type may be or include category identification (ID) and/or subcategory identification (ID). Examples of such types are as follows: a computer, an input device, a printer, a camera, a display (monitor), a gaming device, an audio device, a multimedia device, or a telephone device.

Properties may additionally or alternatively include an advertised device type property which indicates the device type of wireless device 201. The advertised device type may be the device type to be advertised by wireless device 201. Note that there may be two advertised device types specified in the profile: a primary advertised device type, and a secondary advertised device type. The advertised device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The advertised device type may be or include category identification (ID) and/or subcategory identification (ID). Examples of such types are as follows: a computer, an input device, a printer, a camera, a display (monitor), a gaming device, an audio device, a multimedia device, or a telephone device.

Properties in profiles 604 may additionally or alternatively include a service type property which indicates a service type which identifies the service associated with the device. For example, the service types may be or include the appropriate service types as described in the Wi-Fi Peer-To-Peer (P2P) Technical specification (e.g. in Annex E thereof). Examples of such types are as follows: a file sharing service, or a printing service. Alternatively, examples of such types are as follows: Apple File Sharing (AFP) service (or AFP over TCP service), or IP Printing (IPP) Bonjour service.

Properties in profiles 604 may additionally or alternatively include a discovery mode property which indicates a mode utilized for the discovery of devices for the Wi-Fi P2P wireless network connection. The discovery mode property may be set to one of the following: a triggered mode of discovery, or a periodic mode of discovery. Alternatively, the discovery mode may be set to one of the following: a triggered mode of discovery, a periodic mode of discovery, or a Group Owner (GO) mode of discovery.

Properties in profiles 604 may additionally or alternatively include a persistent property or indication which indicates whether or not the Wi-Fi P2P wireless network is persistent. If the network is persistent, when an application is opened or activated, the wireless device connects to a previously-established Wi-Fi P2P wireless network.

Properties in profiles 604 may additionally or alternatively include a coexistence indication or property which indicates whether the Wi-Fi P2P wireless network connection associated with this profile may be maintained while the wireless device operates as a client in an infrastructure network. Properties may additionally or alternatively include another coexistence indication or property which indicates whether the Wi-Fi P2P wireless network connection associated with this profile may be maintained while maintaining another Wi-Fi P2P wireless network connection.

Properties in profiles 604 may additionally or alternatively include an application name is the name of the application associated with the profile. Relatedly, properties in profiles 604 may additionally or alternatively include an application link or address pointer to the application in memory of the wireless device.

Note that properties in profiles 604 may omit a device identifier which identifies any particular device for connection, and/or may omit a wireless network identifier which identifies any particular wireless network for connection. Rather, properties in at least some of profiles 604 indicate connection with particular types of devices (and/or services), and/or indicate connection with particular types of networks, as opposed to specifically identified devices, or specifically identified networks.

More on Use Cases; Additional/Alternative Profile Details.

It is noted that many peer-to-peer "use cases" for Wi-Fi P2P wireless networking lend themselves to different modes of operation. For example, if a wireless device supports a network gateway feature (e.g. a mobile hotspot or MHO feature), then the wireless device may be configured to establish a persistent Wi-Fi P2P wireless network when the service is enabled. As another example, the same wireless device may require a printer service to allow an application to print a document. In this case, the Wi-Fi P2P wireless network may be established on-demand based on an application trigger. In another example, a social networking application may periodically search for other communication devices running the same social networking application, which may result in the wireless device operating in a periodic discovery mode for other devices which advertise the same service.

To accommodate for such various use cases, profiles associated with the various application/services utilizing Wi-Fi P2P wireless networks are created and stored on the wireless device. These profiles are enabled when needed, such as enabled in response to an activation of an application associated therewith. Further, the profiles may be enabled concurrently.

In one embodiment, the profiles may have data structures defined for compatibility with the Wi-Fi Peer-To-Peer (P2P) Technical specification. Each profile may include information specific to Wi-Fi P2P wireless network operation, including device discovery behavior, service discovery options, coexistence with infrastructures connectivity, as well as operational characteristics of the network (e.g. whether it is persistent, or triggered on application launch).

These profiles may be provisioned as defaults in the wireless device, and/or may be configured by applications when installed. Further, the profiles may be configured via the user interface of the wireless device with use of a human-machine interface (HMI) application that provides management of the profiles. This HMI application may be configured to provide the ability to search for and identify any Wi-Fi P2P wireless networks.

The profiles are used to manage the behavior of the WLAN or Wi-Fi driver of the wireless device to accommodate for the various application/services. The driver may be configured to support each particular use case. More particularly, the driver may use the profile information to manage peer-to-peer communications on the wireless device, as well as to arbitrate between Wi-Fi P2P wireless network and other modes of connectivity (e.g. infrastructure STA mode). The driver may be further configured to support other application requirements, such as sleep modes, discovery modes, and/or co-existence with an infrastructure network connection over WLAN, etc.

An example set of properties and/or parameters relating to the behavioral characteristics are summarized in Table 1 below. The properties/parameters in Table 1 may be a subset of parameters contained in such "Wi-Fi Direct" profile to control wireless networking behavior. Such properties/parameters may be included with a set of standard operating parameters for the driver.

TABLE 1

Wi-Fi Direct Profile Properties/Parameters

| Property | Description |
| --- | --- |
| IsPersistent | Indicates whether the Wi-Fi Direct Network is persistent |
| ConnectionInformation | Wi-Fi Direct network information for a persistent profile |
| IsGroupOwner | Indicates whether the device assumes the role of Group Owner (GO) at launch |
| DeviceType | Indicates the device type being searched for to establish the Wi-Fi Direct Network (e.g. as described in Annex B of the Wi-Fi Peer-To-Peer (P2P) Technical specification) |
| AdvertDeviceType | Indicates the device type to be advertised (e.g. as described in Annex B of the Wi-Fi Peer-To-Peer (P2P) Technical specification) |
| ServiceProtocolType | Indicates the service type of service being searched for (e.g. as described in Annex E and F of the Wi-Fi Peer-To-Peer (P2P) Technical specification) |
| DiscoveryMode | Indicates the type of discovery mode: Group Owner (GO) Mode, Triggered Mode, or Periodic Mode |
| DiscoveryParameters | Parameters for discovery, including Wi-Fi Direct defined parameters, and/or Periodic parameters (e.g. period and length of discovery) |
| CoexistWithSTAMode | Indicates whether the network can be established while the device is operating in STA mode |
| CoexistWithOtherWFDService | Indicates whether the device can co-exist in an already-established Wi-Fi Direct Network |
| TDLSCapable | Indicates whether the device is TDLS capable |
| EnableMode | Indicates how the profile is instantiated. Triggered at application launch, or operate when a device of a matching service is discovered. |
| AppName | Name of the application associated with the profile. |
| AppLink | Link or address pointer to the application associated with the profile. |

The property of IsPersistent indicates whether at launch, the wireless device connects to a previously-established Wi-Fi Direct network. The ConnectionInformation parameter stores details on the network.

The ConnectionInformation parameters are a group of parameters which provide connection information for a persistent Wi-Fi direct network.

The property of IsGroupOwner indicates whether the wireless device assumes the role of Group Owner (GO) when the Wi-Fi Direct network is launched. The parameters may be True, False, or Negotiated.

The property of ServiceType indicates the service type of service, e.g. as defined in the Wi-Fi P2P specification. This information is used for Wi-Fi Direct network discovery.

The property of DeviceType allows for different device types to be searched for depending on which Wi-Fi direct profile is enabled. A permissible set of device types is given in Annex B of the Wi-Fi Peer-To-Peer (P2P) Technical specification. If more than one profile is enabled, the first profile is searched for as the primary device type and subsequent profiles are searched for as secondary device types.

The property of AdvertDeviceType allows for different device types to be advertised depending on which Wi-Fi direct profile is enabled. A permissible set of device types is given in Annex B of the Wi-Fi Peer-To-Peer (P2P) Technical specification. If more than one profile is enabled, the first profile is advertised as the primary device type and subsequent profiles are advertised as secondary device types.

The property of ServiceProtocolType is the service identifier for the service, service definition that is used for Wi-Fi P2P discovery. A permissible set of ServiceProtocolTypes is given in Annex E of the Wi-Fi Peer-To-Peer (P2P) Technical specification.

The property of DiscoveryMode indicates how the wireless device behaves for discovery when a profile is enabled. If the discovery mode type is Group Owner (GO), the wireless device performs discovery only after it launches the Wi-Fi P2P wireless network as a Group Owner (GO). Otherwise, the discovery mode is triggered (i.e. started when signaled by an application) or periodic (i.e. periodically goes into discovery mode). The DiscoveryParameters indicate how long the device spends in discovery mode and the interval between discovery periods.

The property of CoexistwithSTAMode indicates whether the Wi-Fi Direct network will operate while the device operates as a STA on an infrastructure WLAN network. Otherwise the Wi-Fi Direct operations would be restricted to periods where the device is not operating in STA mode. The indication of CoexistWithOtherWFD-Services indicates whether the Wi-Fi Direct network will operate at the same time as another Wi-Fi Direct network. For instance, a device may use an instantiated Wi-Fi Direct network for multimedia and printing at the same time, but not for multimedia and network gateway (mobile hotspot) concurrently.

The property of TDLSCapable indicates whether the wireless device supports TDLS (Tunneled Direct Link Setup) technology. This indication allows the wireless device to advertise the indication during the discovery process. For example, if two devices are connected to the same infrastructure network and an application is activated to trigger an enabling of a Wi-Fi Direct profile, the devices may want to establish a TDLS link rather than a Wi-Fi Direct link to provide (more efficient) communications.

The property of EnableMode indicates how the Wi-Fi Direct network is established. For example, the establishing may be triggered on application launch, or may be enabled to signal an application to launch when it discovers another communication device advertising a device type and/or a service type of interest.

The property of AppName is the name of the application associated with the profile. The property of AppLink is the link or the address pointer to the application in memory of the wireless device.

Figure 7:
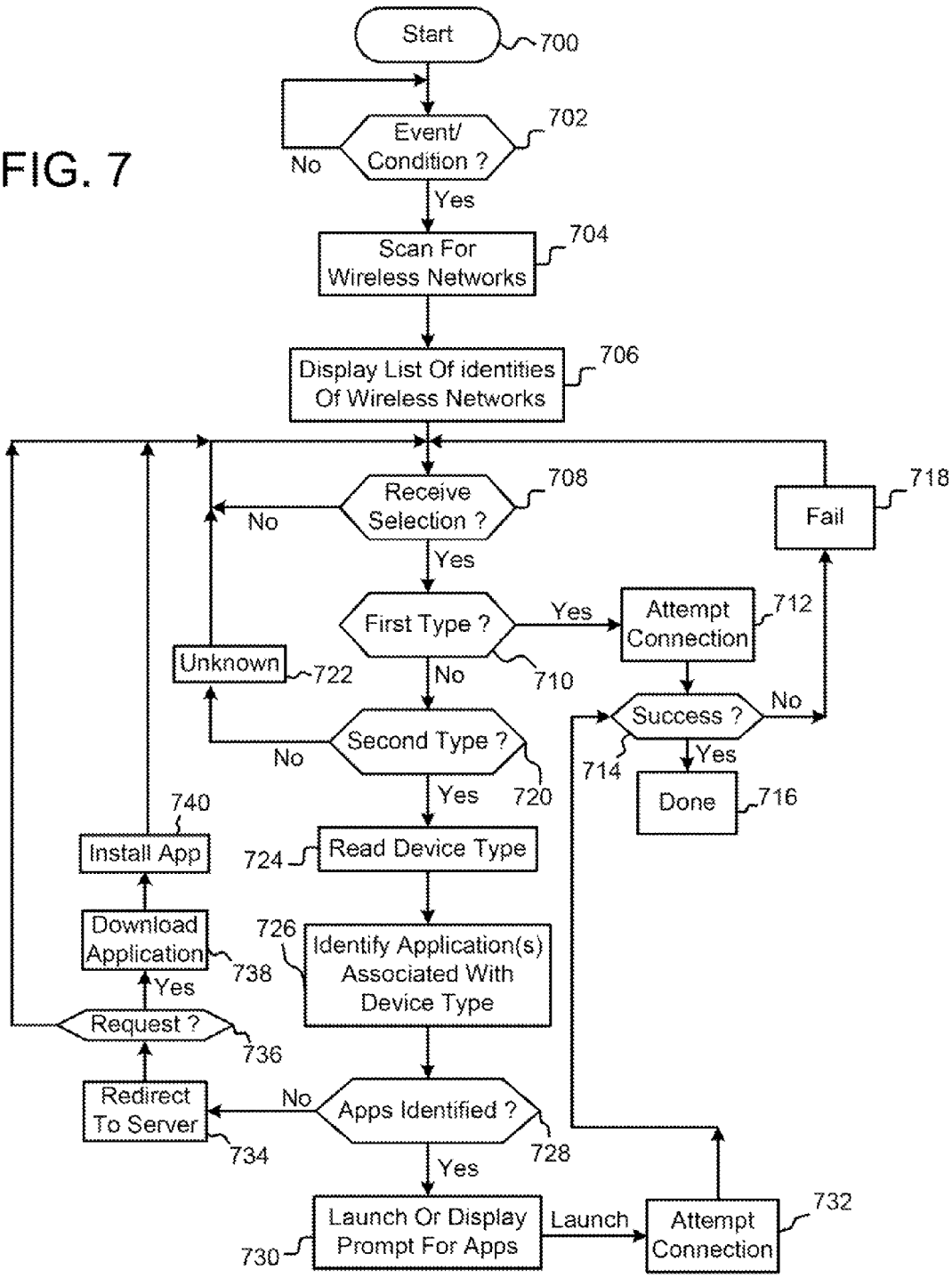
FIG. 7 is a flowchart for describing a method for use in facilitating communication for different types of wireless networks.

FIG. 7 is a flowchart for describing a method for use in facilitating communication for different types of wireless networks. The method of FIG. 7 may be performed by wireless device 201 described in relation to FIGS. 1-6. In particular, the techniques described in relation to the flowchart may be performed by one or more controllers or processors of the wireless device along with its wireless or RF transceiver. A computer program product which may embody the technique may include a computer readable medium (e.g. memory of the communication device, computer disk, CD-ROM, etc.) having computer instructions stored therein which are executable by the one or more processors of the wireless device for performing the technique. In such technique, the wireless device may operate in accordance with or be compatible with the Wi-Fi P2P wireless network protocols in the Wi-Fi Peer-To-Peer (P2P) Technical specification.

The wireless device is configured to store a plurality of profiles in its memory. Some of the profiles may be profiles associated with a first type of wireless network (e.g. WLAN infrastructure network type), and some of the profiles may be profiles associated with a second type of wireless network (e.g. Wi-Fi P2P wireless network type). Each profile of the second type may be associated with an application of the wireless device, and includes properties and/or parameters contained therein. One property in the profile of the second type is a device type property which indicates a device type associated with the profile. Another property in the profile of the second type is application name and/or application link to an application associated with the profile.

Beginning at a start block 700 of FIG. 7, the wireless device identifies whether an event or condition has occurred (step 702 of FIG. 7). The event or condition may be the receipt of an input request via the user interface for searching for, displaying, and/or manually selecting an available wireless network for communication; a loss of a network connection; or an expiration of a periodic timer; as a few examples.

In response to identifying the event or condition in step 702, the wireless device performs a scanning operation for identifying wireless networks in its surrounding coverage area (step 704 of FIG. 7). The wireless device then displays a list of identifiers of these wireless networks (step 706 of FIG. 7). One of the wireless networks identified in the list may be manually selected for communication by the user via the user interface.

Note that step 704 may be performed at a different time than that provided for in FIG. 7. For example, in response to identifying the event or condition in step 702, the wireless device may display a list of identifiers of wireless networks that were identified through a previous scanning operation, prior to the identification of the event or condition.

Figure 8:
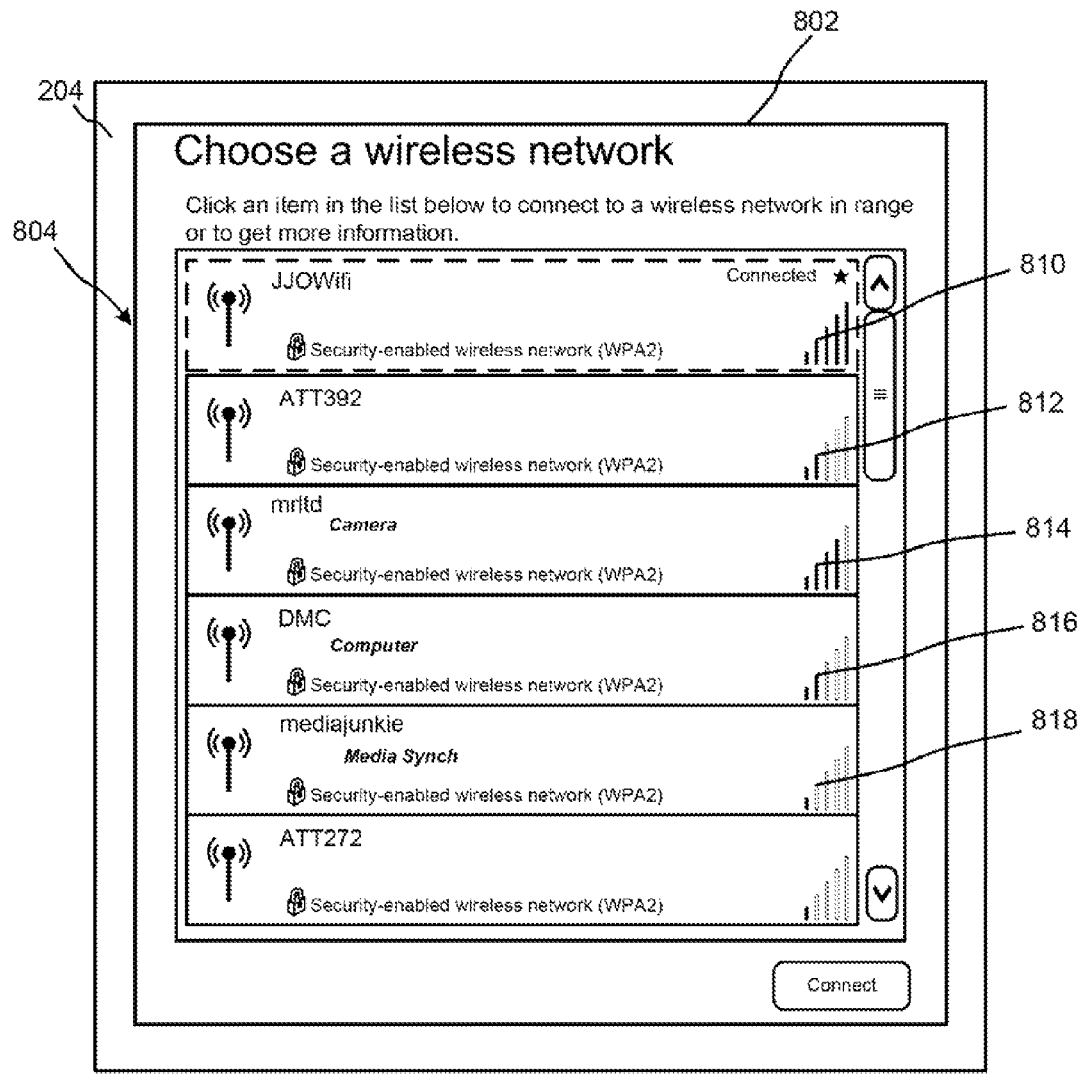
FIG. 8 is an illustrative example of a display of the wireless device, which is shown displaying a list of identifiers of wireless networks, one of which may be manually selected for communication.

To illustrate the displaying step 706 of FIG. 7, FIG. 8 shows an illustrative example of the display 204 of the wireless device which is displaying a list 804 of identifiers of wireless networks, one network of which may be manually selected via the user interface for communication. The list 804 may be presented in a display window 802 of a utility or application of the wireless device, such as a wireless network connection management utility. The list 804 of identifiers may include one or more set service identifiers (SSIDs), one or more extended SSIDs (ESSIDs), or both. In this example, the list 804 of identifiers of wireless networks includes an identifier 810 ("JJOWifi"), an identifier 812 ("ATT272"), an identifier 814 ("mrltd"), an identifier 816 ("DMC"), an identifier 818 ("mediajunkie"), an others.

The identified wireless networks may be of a first type (e.g. a WLAN infrastructure type) or a second type (e.g. a Wi-Fi P2P type). Here, identifiers 810 and 812 are identifiers of wireless networks of the first type (e.g. the WLAN infrastructure type), and identifiers 814, 816, and 818 are identifiers of wireless networks of the second type (e.g. the Wi-Fi P2P type). Each identifier in the list 804 may include a device type associated with the corresponding wireless network.

Note that wireless networks of the second type may include a P2P wireless device which is designated as a group owner (GO) to serve as a wireless access point (AP), broadcasting beacon frames and/or operating in a listening mode. As another example, wireless networks of the second type may additionally or alternatively include a P2P wireless device which is not a group owner (GO), but operates in a listening mode.

Referring back to the flowchart of FIG. 7, the wireless device may receive an input request for selecting one of the wireless networks for communication (step 708 of FIG. 7). If an input request is received in step 708, then the wireless device identifies whether the selected wireless network is of the first type or the second type (steps 710 and 720 of FIG. 7). The wireless device may make this identification based on any suitable technique.

In some embodiments, the wireless device identifies whether the selected wireless network is of the first type or the second type based on a predetermined data element which may or may not be associated with the network. More particularly, the wireless device may identify whether the selected wireless network is of the first or the second type based on whether a predetermined data element is received from the selected wireless network. For example, the predetermined data element may be a "peer-to-peer (P2P) element" which includes a device type. See e.g. the Wi-Fi Peer-To-Peer (P2P) Technical specification which defines a peer-to-peer (P2P) element. In such embodiments, the wireless device may identify that the selected network is of the second type based on receiving, from the selected network, a peer-to-peer (P2P) element which includes the device type, but otherwise identify that the selected network is of the first type based on a failure to receive a peer-to-peer (P2P) element from the selected network.

If the wireless device identifies that the selected wireless network is of the first type (e.g. WLAN infrastructure type), then the wireless device attempts to connect with the selected wireless network (step 712 of FIG. 7). If the attempt to connect is successful (step 714 of FIG. 7), then a wireless connection has been established with the selected wireless network. The wireless device may then communicate in the connected network for one or more services, and the flowchart ends at a done block 716 in FIG. 7. If the attempt to connect is unsuccessful in step 714, then the wireless device may display a connection failure (step 718 of FIG. 7) and repeat operation back to step 708, awaiting an alternative request via the user interface.

If the wireless device identifies that the selected wireless network is of the second type (e.g. Wi-Fi P2P type), then the wireless device performs different operations than that for the first type. The wireless device reads the device type associated with the selected wireless network (step 724 of FIG. 7).

The device type may be received from a wireless network which is of the second type. Correspondingly, no device type may be received from a wireless network of the first type.

The wireless device proceeds to identify one or more applications in memory which have a stored association with the device type (step 726 of FIG. 7). For each application, there may exist a corresponding profile, and for each profile there may exist a device type property and an application name and/or application link to the application. The wireless device may identify one or more applications in step 726 by comparing the received device type with the device type property stored in each one of the profiles. If a match is identified based on the comparing, then the wireless device reads an application name and/or application link which is stored in the profile, for identifying the application.

If an application is identified (step 728 of FIG. 7), then the wireless devices launches or displays an input prompt for launching the identified application (step 730 of FIG. 7). Here, the wireless device uses the application name and/or application link from previous step 726 to launch or display the input prompt. In some embodiments, no attempt to establish a connection with the selected wireless network has been made at this time. Rather, only upon or after launching the or the application, the wireless device attempts to connect with the selected wireless network (step 732 of FIG. 7). If the attempt to connect is successful (step 714 of FIG. 7), then a wireless connection has been established with the selected wireless network, and the launched application will be utilized for communication with the selected wireless network.

Figure 9:
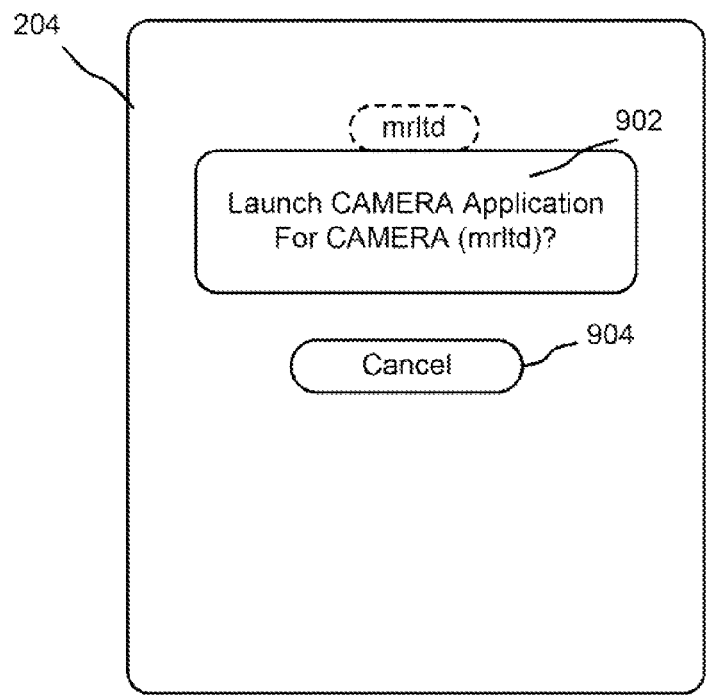
FIG. 9 is an illustrative example of the display of the wireless device, which is shown displaying an input prompt for launching an application having a stored association with a device type of the wireless network selected in FIG. 8.
Figure 10:
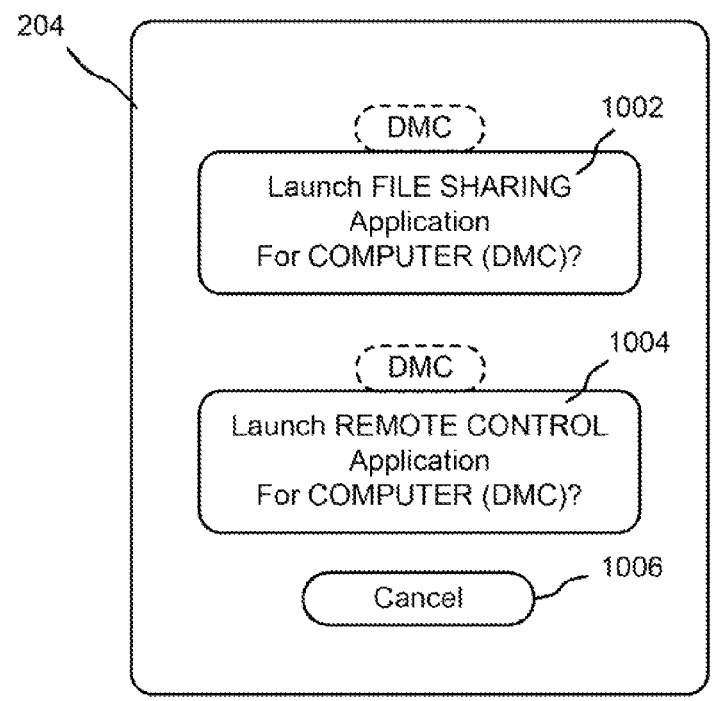
FIG. 10 is an illustrative example of the display of the wireless device, which is shown displaying a plurality of input prompts for launching a plurality of different applications having stored associations with a device type of the wireless network selected in FIG. 8.

FIG. 9 is an example of an input prompt 902 which may be shown in the display 204 in step 730 of FIG. 7. In this example, input prompt 902 includes text which reads "Launch Camera Application?" and, when invoked via the user interface, will launch the camera application. An input prompt 904 for canceling the launching of the application may also be provided in display 204. In addition, FIG. 10 is another example of a plurality of input prompts 1002 and 1004 which may be shown in the display 204 in step 730 of FIG. 7. In this example, input prompt 1002 includes text which reads "Launch File Sharing Application?", and input prompt 1004 includes text which reads "Launch Remote Control Application?" When input prompt 1002 is invoked via the user interface, the file sharing application will be launched. On the other hand, when input prompt 1004 is invoked via the user interface, the remote control application will be launched. Input prompts for other applications function in the same manner. An input prompt 1006 for canceling the launching of these applications may also be provided in display 204. The example of FIG. 10 illustrates that it is possible to have two or more applications (and two or more input prompts) associated with the same device type.

If there are no stored applications associated with the device type in step 728, then the wireless device is redirected to a server (see e.g. server 118 of FIG. 1) for obtaining an application associated with the device type (step 734 of FIG. 7). No attempt to establish a connection with the selected wireless network has been made at this time. The server is configured to provide an application downloading service for devices. The server may store and/or maintain access to a plurality of different applications and provide devices with any of these applications for download and installation. In some embodiments, the server is configured to operate as an "Application Store" for the device to obtain (e.g. purchase and/or download) any one of the applications.

The wireless device may display an input prompt for downloading the application associated with the device type from the server. If the wireless device submits a request to the server for an application (step 736 of FIG. 7), then the wireless device proceeds to download (i.e. receive) the application from the server (step 738 of FIG. 7). After receipt of the application, the wireless device installs the application (step 740 of FIG. 7) so that the application is executable on the device. The wireless device may optionally cause operation to proceed back to step 708 for the user to the re-enter the input request for selecting one of the wireless networks for communication. Alternatively, the wireless device may launch or display an input prompt for launching the recently received and installed application (e.g. step 730 of FIG. 7).

On the other hand, in step 736, the user may alternatively choose to refrain from submitting a request to the server, in which case operation will proceed back to step 708, awaiting for an alternative input request to select one of the wireless networks.

As the server may maintain access to a large number of different applications, the server may be further configured to provide a search function for searching for the application relevant to the device type. The search function allows for a search query to be submitted to the server to search for a particular application. The search query is submitted in a search field in the display of the wireless device. In response to the search query, the server will return search results which include a list of identifiers for one or more applications relevant to the device type. The wireless device may then request and obtain one of the applications.

In some embodiments, when the wireless device is redirected to the server in step 734 the wireless device (automatically) populates the search field with the device type (or relevant terms associated with the device type). The wireless device may also (automatically) submit to the server the search query which includes the device type (or the relevant terms associated with the device type). The search results which include the list of identifiers of the applications relevant to the device type are provided in the display of the wireless device. Even further, the application may be (automatically) downloaded and/or installed in the device, so that the application may be launched.

Figure 11:
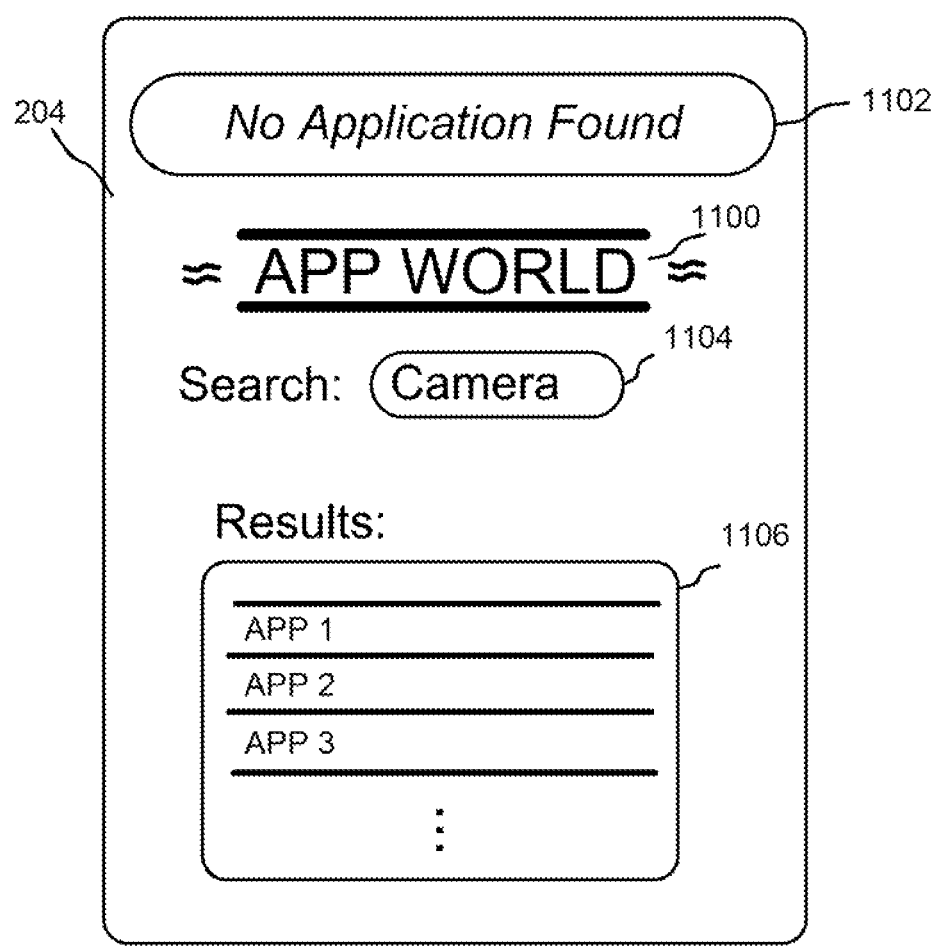
FIG. 11 is an illustrative example of the display of the wireless device, which is shown displaying a presentation from a server configured to provide an application associated with a device type of the wireless network selected in FIG. 8.

FIG. 11 is an example of the display 204 which displays a presentation 1100 (an "App Store" presentation) from the server for obtaining the application for step 734 of FIG. 7. In this example, an indication 1102 that no stored application was found in the device ("No Application Found") is displayed. In addition, the name of the application downloading service is provided (e.g. "APP WORLD"). Further, a search field 1104 for searching for applications in the application downloading service and a results field 1106 for providing results of the search are provided. As shown, search field 1104 includes the device type (in this example, "CAMERA") and results field 1106 includes one or more identifiers for one or more applications relevant to the search query. In this example, the search results include three applications ("APP 1", "APP 2", and "APP 3").

In some embodiments, when the selected wireless network has a device type that corresponds to one or more predetermined device types, the wireless device allow for immediate connection. Specifically, if it is identified that the selected wireless network is of the second type in step 720, then the device type is read in step 724 and compared to one or more predetermined device types. If a match between the device type and the predetermined device type exists, then processing proceeds to step 732 (i.e. attempt to connect with the network) without identifying or launching any applications. In one example, a predetermined device type may be an Internet gateway device.

As provided herein, techniques in a wireless device for facilitating communication for different types of wireless networks have been described. In one illustrative example, the device displays a list of identifiers of wireless networks, and receives an input request for selecting one of the wireless networks for communication. When the selected wireless network is of a first type, the device attempts to establish a connection with the selected wireless network. When the selected wireless network is of a second type, the device launches or displays an input prompt to launch an application having a stored association with a device type of the selected wireless network.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

The invention claimed is:

1. A method in a wireless device for wireless communications, the method comprising:
   storing one or more profiles of wireless networks;
   displaying a list of identifiers of wireless networks;
   receiving an input request for selecting one of the wireless networks for communication;
   when the selected wireless network is of a first type, attempting to establish a connection with the selected wireless network; and
   when the selected wireless network is of a second type having a defined device type;
      wherein the stored one or more profiles comprise a first profile matching a first network of the second type and a second profile matching a second network of the second type;
      identifying at least one stored profile matching the selected wireless network, the identified at least one stored profile storing an association between the defined device type and at least one application;
      using the identified at least one stored profile, identifying the at least one application having a stored association with the defined device type; and
      launching or displaying an input prompt for launching the application having the stored association with the device type of the selected wireless network.

2. The method of claim 1, wherein the first type is a wireless local area network (WLAN) infrastructure network.

3. The method of claim 1, wherein the second type is a Wi-Fi Peer-to-Peer (P2P) network.

4. The method of claim 1, further comprising:
   identifying that the selected wireless network is of the second type based on whether a data element which includes the device type is received from the selected wireless network.

5. The method of claim 4, wherein the data element comprises a peer-to-peer (P2P) element which includes the device type.

6. The method of claim 1, further comprising:
   identifying that the selected wireless network is of the second type based on receiving, from the selected wireless network, a peer-to-peer (P2P) element which includes the device type; and
   identifying that the selected wireless network is of the first type based on a failure to receive the P2P element which includes the device type.

7. The method of claim 1, further comprising:
   performing a scanning operation for receiving the identifiers of the wireless networks, the identifiers comprising one or more set service identifiers (SSIDs), one or more extended SSIDs (ESSIDs), or both.

8. The method of claim 1, further comprising:
   when the wireless device fails to include the application having the stored association with the device type, downloading or displaying an input prompt for downloading the application from a server.

9. The method of claim 1, further comprising:
   when the wireless device fails to include the application having the stored association with the device type, displaying an input prompt to search for the application based on a search query which includes the device type.

10. The method of claim 1, wherein the defined device type comprises at least one of the following: a computer, a printer, a camera, a display, a gaming device, an audio device, a multimedia device, or a telephone device.

11. A computer program product, comprising:
    a non-transitory computer readable medium;
    computer instructions stored in the non-transitory computer readable medium;
    the computer instructions being executable by one or more processors of a wireless communication device for:
       storing one or more profiles of wireless networks;
       displaying a list of identifiers of wireless networks;
       receiving an input request for selecting one of the wireless networks for communication;
       when the selected wireless network is of a first type, attempting to establish a connection with the selected wireless network; and
       when the selected wireless network is of a second type having a defined device type;
          wherein the stored one or more profiles comprise a first profile matching a first network of the second type and a second profile matching a second network of the second type;
          identifying at least one stored profile matching the selected wireless network, the identified at least one stored profile storing an association between the defined device type and at least one application;
          using the identified at least one stored profile, identifying the at least one application having a stored association with the defined device type Land
          launching or displaying an input prompt for launching the application having the stored association with the device type of the selected wireless network.

12. A wireless communication device, comprising:
    one or more processors;
    a user interface comprising a display;
    a wireless transceiver coupled to the one or more processors, the wireless transceiver being configured to provide for wireless communications;
    the one or more processors being configured to:
    store one or more profiles of wireless networks;
    cause a list of identifiers of wireless networks to be displayed in the display;
    receive an input request for selecting one of the wireless networks for communication;

when the selected wireless network is of a first type, attempt to establish a connection with the selected wireless network via the wireless transceiver; and when the selected wireless network is of a second type having a defined device type;

wherein the stored one or more profiles comprise a first profile matching a first network of the second type and a second profile matching a second network of the second type;

identifying at least one stored profile matching the selected wireless network, the identified at least one stored profile storing an association between the defined device type and at least one application;

using the identified at least one stored profile, identifying the at least one application having a stored association with the defined device type Land launch or display an input prompt to launch the application having the stored association with the device type of the selected wireless network.

13. The wireless communication device of claim 12, wherein the first type is a wireless local area network (WLAN) infrastructure network.

14. The wireless communication device of claim 12, wherein the second type is a Wi-Fi Peer-to-Peer (P2P) network.

15. The wireless communication device of claim 12, wherein the one or more processors are further configured to:
identify that the selected wireless network is of the second type based on whether a data element which includes the device type is received from the selected wireless network.

16. The wireless communication device of claim 15, wherein the data element comprises a peer-to-peer (P2P) element which includes the device type.

17. The wireless communication device of claim 12, wherein the one or more processors are further configured to:
perform a scanning operation for receiving the identifiers of the wireless networks, the identifiers comprising one or more set service identifiers (SSIDs), one or more extended SSIDs (ESSIDs), or both.

18. The wireless communication device of claim 12, wherein the one or more processors are further configured to:
download, or display an input prompt to download, the application from a server when the wireless device fails to include the application having the stored association with the device type.

19. The wireless communication device of claim 12, wherein the one or more processors are further configured to:
when the wireless device fails to include the application having the stored association with the device type, display an input prompt to search for the application based on a search query which includes the received device type.

20. The method of claim 1, further comprising:
when the selected wireless network is of the second type, attempting to establish a connection with the selected wireless network.

21. The wireless communication device of claim 12, wherein the one or more processors are further configured to:
when the selected wireless network is of the second type, attempt to establish a connection with the selected wireless network.

22. The method of claim 1, wherein the first profile stores an association between a first device type and at least one first application, and the second profile stores an associating between a second device type and at least one second application.

* * * * *

UNITED STATES PATENT AND TRADEMARK OFFICE
CERTIFICATE OF CORRECTION

PATENT NO. : 9,060,329 B2  
APPLICATION NO. : 13/490068  
DATED : June 16, 2015  
INVENTOR(S) : Michael Peter Montemurro Page 1 of 1

It is certified that error appears in the above-identified patent and that said Letters Patent is hereby corrected as shown below:

In the Claims:

In column 22, line 52, claim 11 should read:
"...association with the defined device type; and..."

In column 24, line 31, claim 22 should read:
"...application, and the second profile stores an association..."

Signed and Sealed this
Thirteenth Day of October, 2015

Michelle K. Lee
*Director of the United States Patent and Trademark Office*